(12) United States Patent
Chen et al.

(10) Patent No.: US 10,480,811 B1
(45) Date of Patent: Nov. 19, 2019

(54) SAFETY GAS VALVE RELAY DRIVING CIRCUITS

(71) Applicant: EMERSON ELECTRIC CO., St. Louis, MO (US)

(72) Inventors: Cuiyun Chen, Jiangsu (CN); Yindan Zhang, Jiangsu (CN); Yonglong Hu, Jiangsu (CN)

(73) Assignee: EMERSON ELECTRIC CO., St. Louis, MO (US)

( * ) Notice: Subject to any disclaimer, the term of this patent is extended or adjusted under 35 U.S.C. 154(b) by 0 days.

(21) Appl. No.: 16/218,232

(22) Filed: Dec. 12, 2018

(51) Int. Cl.
| | |
|---|---|
| *F24F 11/88* | (2018.01) |
| *H02M 3/07* | (2006.01) |
| *H01H 47/00* | (2006.01) |
| *H01H 47/02* | (2006.01) |

(52) U.S. Cl.
CPC ............ *F24F 11/88* (2018.01); *H01H 47/001* (2013.01); *H01H 47/02* (2013.01); *H02M 3/07* (2013.01)

(58) Field of Classification Search
CPC ....... F24F 11/88; H01H 47/02; H01H 47/001; H02M 3/07
USPC ......................................................... 361/190
See application file for complete search history.

(56) References Cited

U.S. PATENT DOCUMENTS

| | | | | |
|---|---|---|---|---|
| 5,902,099 | A | * 5/1999 | Rowlette ................. | F23N 5/123 126/116 A |
| 7,123,020 | B2 | * 10/2006 | Hill ........................ | F23N 5/242 324/522 |
| 2015/0055271 | A1 | * 2/2015 | Chen ..................... | H01H 47/325 361/190 |

\* cited by examiner

*Primary Examiner* — John W Poos
(74) *Attorney, Agent, or Firm* — Harness, Dickey & Pierce, P.L.C.; Anthony G. Fussner

(57) ABSTRACT

A safety gas valve relay driving circuit for an HVAC system includes a gas valve relay including an output for selectively enabling and disabling a gas valve in an HVAC system according to an energization state of the gas valve relay, and a charge pump circuit to control energization of the gas valve relay. The charge pump circuit includes a charge pump capacitor. The driving circuit also includes first and second inputs for receiving first and second driving signals from at least one controller, a low-pass filter coupled between the first input and the charge pump circuit to filter the received first driving signal, and a high-pass filter watchdog circuit coupled between the second input and the charge pump circuit to filter the received second driving signal. Example methods of driving a gas valve relay for an HVAC system are also disclosed.

17 Claims, 4 Drawing Sheets

SAFETY GAS VALVE RELAY DRIVING CIRCUITS

FIELD

The present disclosure generally relates to safety gas valve relay driving circuits for HVAC systems.

BACKGROUND

This section provides background information related to the present disclosure which is not necessarily prior art.

Relay driving circuits for gas valves are often sensitive to typical alternating current (AC) line frequency (e.g., about sixty hertz), often sensitive to higher frequency noise from a switched-mode power supply, etc. In order to avoid issues from these sources of noise, complex circuit layouts and positioning of circuit components must be considered, leading to lower design efficiency, increased costs, increased circuit size on a printed circuit board (PCB), etc.

DRAWINGS

The drawings described herein are for illustrative purposes only of selected embodiments and not all possible implementations, and are not intended to limit the scope of the present disclosure.

Corresponding reference numerals indicate corresponding (although not necessarily identical) parts throughout the several views of the drawings.

DETAILED DESCRIPTION

Example embodiments will now be described more fully with reference to the accompanying drawings.

Figure 1:
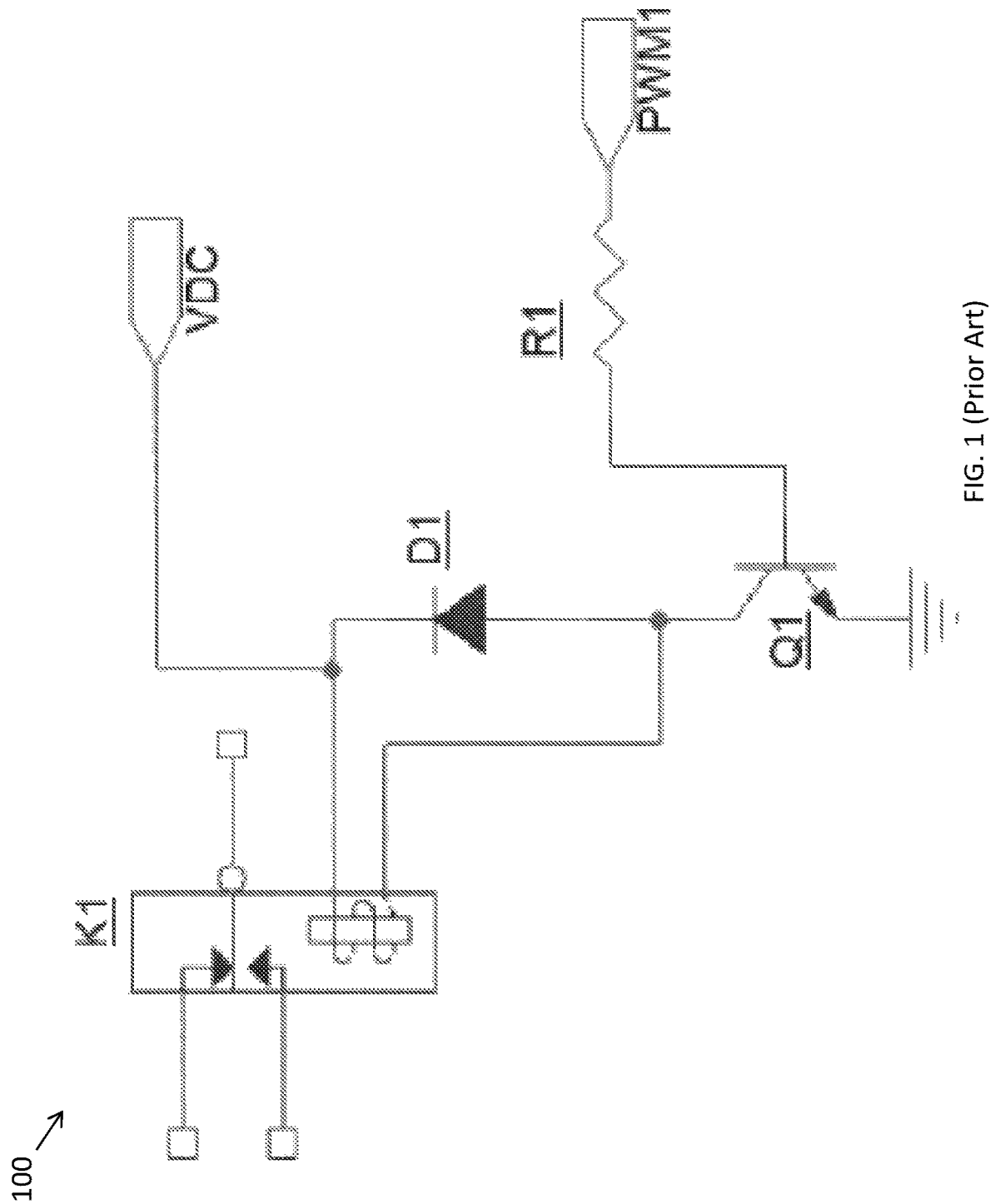
FIG. 1 is a diagram of a safety gas valve relay driving circuit for an HVAC system according to the prior art.

FIG. 1 illustrates a gas valve relay driving circuit 100 including a gas valve relay K1 for gas valve power switching. When a driving signal PWM1 from a microprocessor, etc., is at a logical high value (e.g., about 3.3V, about 5V, etc.), switch Q1 is turned on to conduct current. A resistor R1 is coupled between the switch Q1 and the input for receiving the driving signal PWM1.

Turning on switch Q1 allows the voltage supply node VDC to supply power to the gas valve relay K1 (e.g., energize the gas valve relay K1 to an "on" state, etc.). When the gas valve relay is energized, a gas valve connected to the gas valve relay K1 is activated. The gas valve relay driving circuit 100 also includes a flyback diode D1 for current continuity in the coil of the gas valve relay K1.

The gas valve relay driving circuit 100 provides a simple circuit for controlling activation of a gas valve, but the circuit 100 has a low reliability of turning off the gas valve when any component in the circuit 100 fails. For example, if the switch Q1 fails and is broken due to a short circuit, etc., the gas valve relay K1 will always be in an energized "on" state, regardless of the state of the driving signal PM1.

As another example, if a microprocessor supplying the driving signal PWM1 is not operating properly and the driving signal PWM1 is always at the logical high value, the gas valve relay K1 will always be in the energized "on" state. As recognized herein, there is a need to design a gas valve relay driving circuit that will not turn on the gas valve when any of the circuit components fail.

Figure 2:
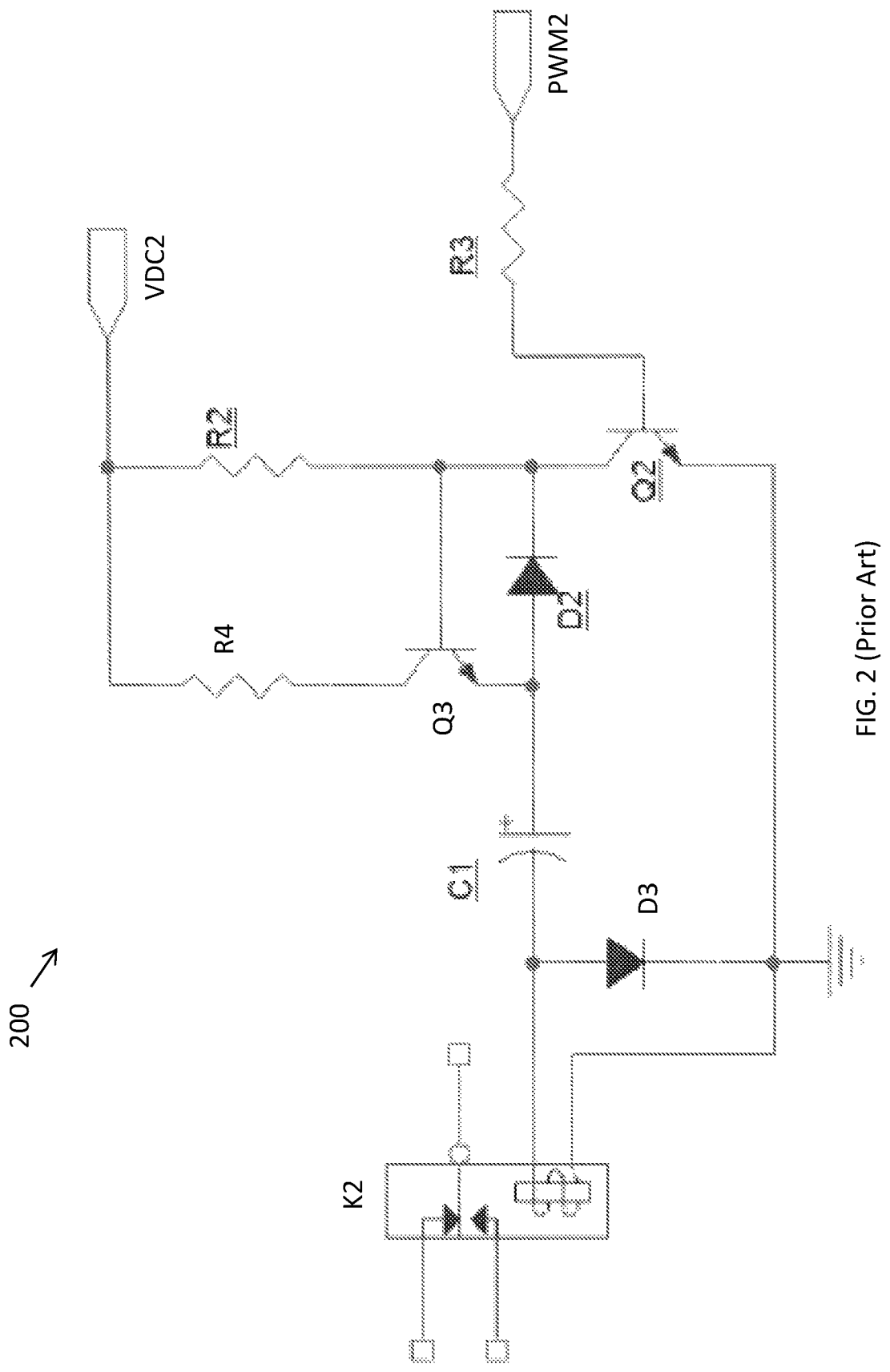
FIG. 2 is a diagram of another safety gas valve relay driving circuit for an HVAC system according to the prior art.

In order to address the issue of inadvertently turning on the gas valve when one of the circuit components fails, the gas valve relay driving circuit 200 illustrated in FIG. 2 includes a charge pump circuit having a charge pump capacitor C1 to drive the gas valve relay K2.

Specifically, PWM2 is a pulse driving signal from a microprocessor, etc., that alternately turns on and turns off the switches Q2 and Q3. In turn, the charge pump capacitor C1 is alternately charged and discharged. Discharge current from the charge pump capacitor C1 goes through the gas valve relay K2, to energize the gas valve relay K2.

As shown in FIG. 2, the gas valve driving circuit 200 includes a diode D2 coupled between the switch Q2 and a node joining the switch Q3 with the charge pump capacitor C1. The gas valve driving circuit 200 also includes a resistor R2 coupled between the voltage supply node VDC2 and the switch Q2, a resistor R3 coupled between the switch Q2 and the input of the driving signal PWM2, and a resistor R4 coupled between the voltage supply node VDC2 and the switch Q3.

The gas valve driving circuit 200 provides advantages of inhibiting activation of the gas valve relay K2 when a component in the circuit 200 fails. For example, neither a constant logical high value nor a constant logical low value of the driving signal PWM2 will activate the gas valve relay K2, because a pulse signal is used to charge and discharge the charge pump capacitor C1. Additionally, improper operation of the microprocessor supplying the driving signal PWM2 will not activate the gas valve relay K2.

The driving signal PWM2 typically uses a wide frequency band to drive the charge pump circuit to turn on the gas valve relay K2, which often includes an AC line frequency of about sixty hertz. Therefore, the gas valve driving circuit 200 may be sensitive to the AC line frequency noise (e.g., may falsely activate the gas valve relay K2 in response to AC line frequency noise), so noise frequency rejection by the gas valve driving circuit is limited.

The gas valve driving circuit 200 is also typically sensitive to higher frequency noise, such as noise generated by a switched-mode power supply (e.g., about twenty kilohertz (KHz) to about one megahertz (MHz), etc.). In view of the above, a PCB layout should separate the AC signal and high frequency signals from the gas valve driving circuit 200, to reduce effects from AC and high frequency signals.

Figure 3:
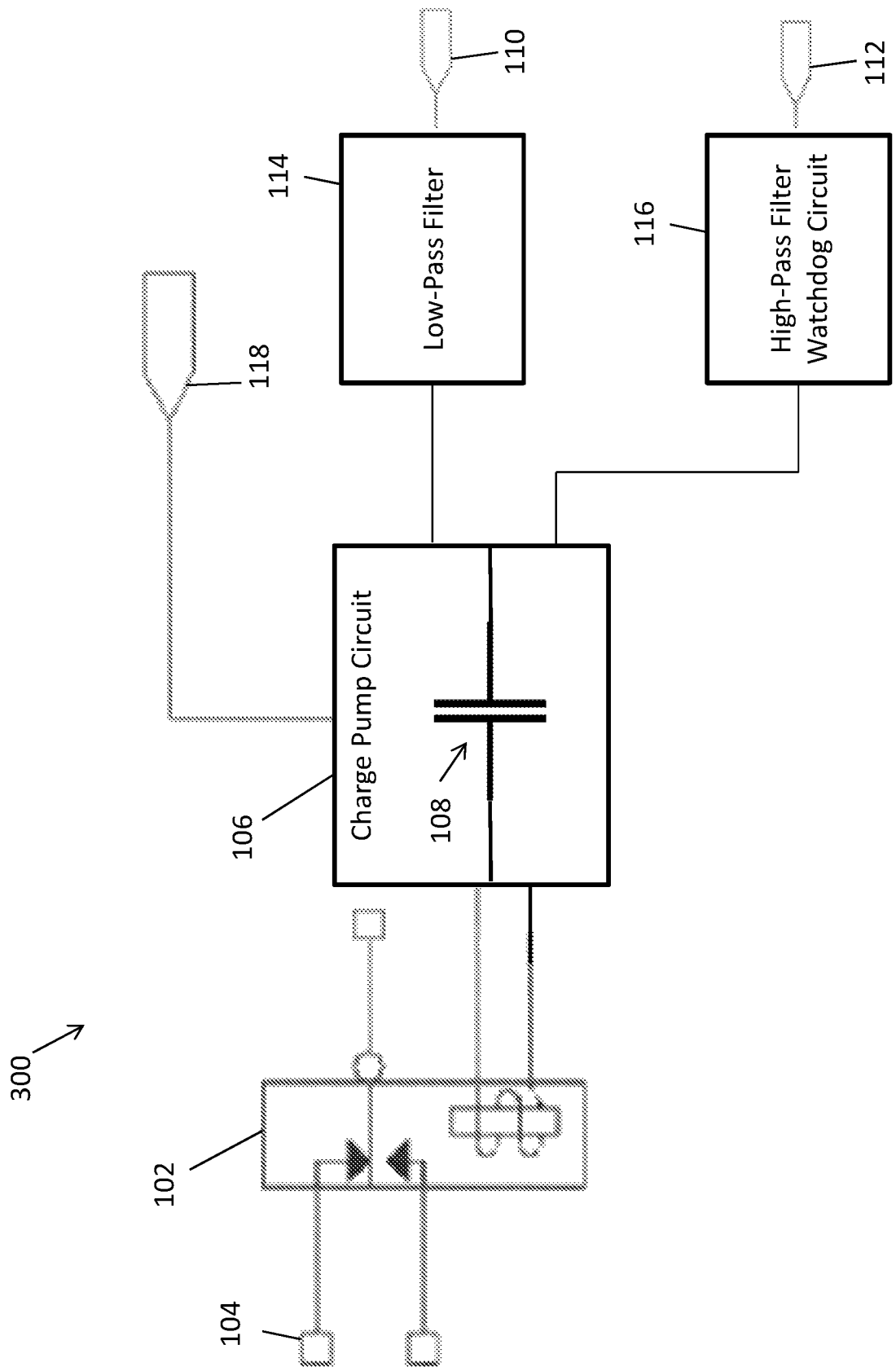
FIG. 3 is a block diagram of a safety gas valve relay driving circuit for an HVAC system according to an example embodiment of the present disclosure.

FIG. 3 illustrates a safety gas valve relay driving circuit 300 according to one example embodiment of the present disclosure. As shown in FIG. 3, the safety gas valve relay driving circuit 300 includes a gas valve relay 102 including an output 104 for selectively enabling and disabling a gas valve in an HVAC system according to an energization state of the gas valve relay 102. The gas valve (not shown) may be part of any suitable HVAC system component, such as a single stage furnace control, etc.

A charge pump circuit 106 is coupled with the gas valve relay 102 to control energization of the gas valve relay 102. The charge pump circuit 106 includes a charge pump capacitor 108. As described above, the charge pump capacitor 108 in charge pump circuit 106 is alternately charged and discharged according to one or more driving pulse signals received at the input 110 and the input 112 of the safety gas valve relay driving circuit 300.

The charge pump circuit 106 is coupled to receive a bias supply from a voltage supply node 118. The voltage supply node 118, the output 104, the input 110 and the input 112 may each include any suitable terminals, connectors, wire traces, etc., for establishing an electrical connection.

When the charge pump capacitor 108 is discharged, the coil of the gas valve relay 102 is energized to turn on (e.g., activate, etc.) a gas valve of an HVAC system. The charge pump circuit 106 may inhibit activation of the gas valve relay 102 in response to a failed circuit component, such as a short-circuited switch, a constant logical high or low value driving signal, etc.

The safety gas valve relay driving circuit 300 also includes a low-pass filter 114. The low-pass filter 114 is coupled to receive a driving signal from a controller (e.g., a microprocessor, an integrated control circuit, etc.) at the input 110. The low-pass filter 114 is coupled between the input 110 and the charge pump circuit 106 to filter the driving signal received from the controller.

The low-pass filter 114 may be arranged to filter higher frequency signals, such as noise from a switched-mode power supply (SMPS) (e.g., greater than or equal to about twenty kilohertz, greater than or equal to about one megahertz, etc.). The low-pass filter 114 inhibits (e.g., prevents, reduces, etc.) any higher frequency signals from inadvertently turning on the gas valve relay 102.

The safety gas valve relay driving circuit 300 further includes a high-pass filter watchdog circuit 116. The high-pass filter watchdog circuit 116 is coupled to receive a driving signal from a controller (e.g., a microprocessor, an integrated control circuit, etc.) at the input 112.

The controller that provides the driving signal to the high-pass filter watchdog circuit 116 may be the same or a different controller as the controller that provides the driving signal to the low-pass filter 114. Similarly, the driving signal received by high-pass filter watchdog circuit 116 at the input 112 may be the same or a different driving signal as the driving signal received by the low-pass filter 114 at the input 110.

The high-pass filter watchdog circuit 116 is coupled between the input 110 and the charge pump circuit 106 to filter the driving signal received at the input 112. The high-pass filter watchdog circuit 116 may be arranged to filter lower frequency signals, such as noise from an AC line input (e.g., less than or equal to about sixty hertz, etc.). The high-pass filter watchdog circuit 116 inhibits any lower frequency signals from inadvertently turning on the gas valve relay 102.

In the safety gas valve relay driving circuit 300, a frequency of the driving signal(s) should be within a specified frequency band range in order to energize the gas valve relay 102, due to the low-pass filter 114 and the high-pass filter watchdog circuit 116.

For example, the frequency of the driving signal(s) should be below a filter frequency of the low-pass filter 114 (e.g., less than about twenty kilohertz, etc.) and should be above a filter frequency of the high-pass filter watchdog circuit 116 (e.g., greater than about sixty hertz, etc.) in order to energize the gas valve relay 102.

In this manner, the low-pass filter 114 and the high-pass filter watchdog circuit 116 can provide good noise rejection for AC line frequencies, good noise rejection for switched-mode power supply frequencies, etc. This allows for convenient printed circuit board layouts where there is no requirement to separate traces that have AC line frequency signal, etc.

Figure 4:
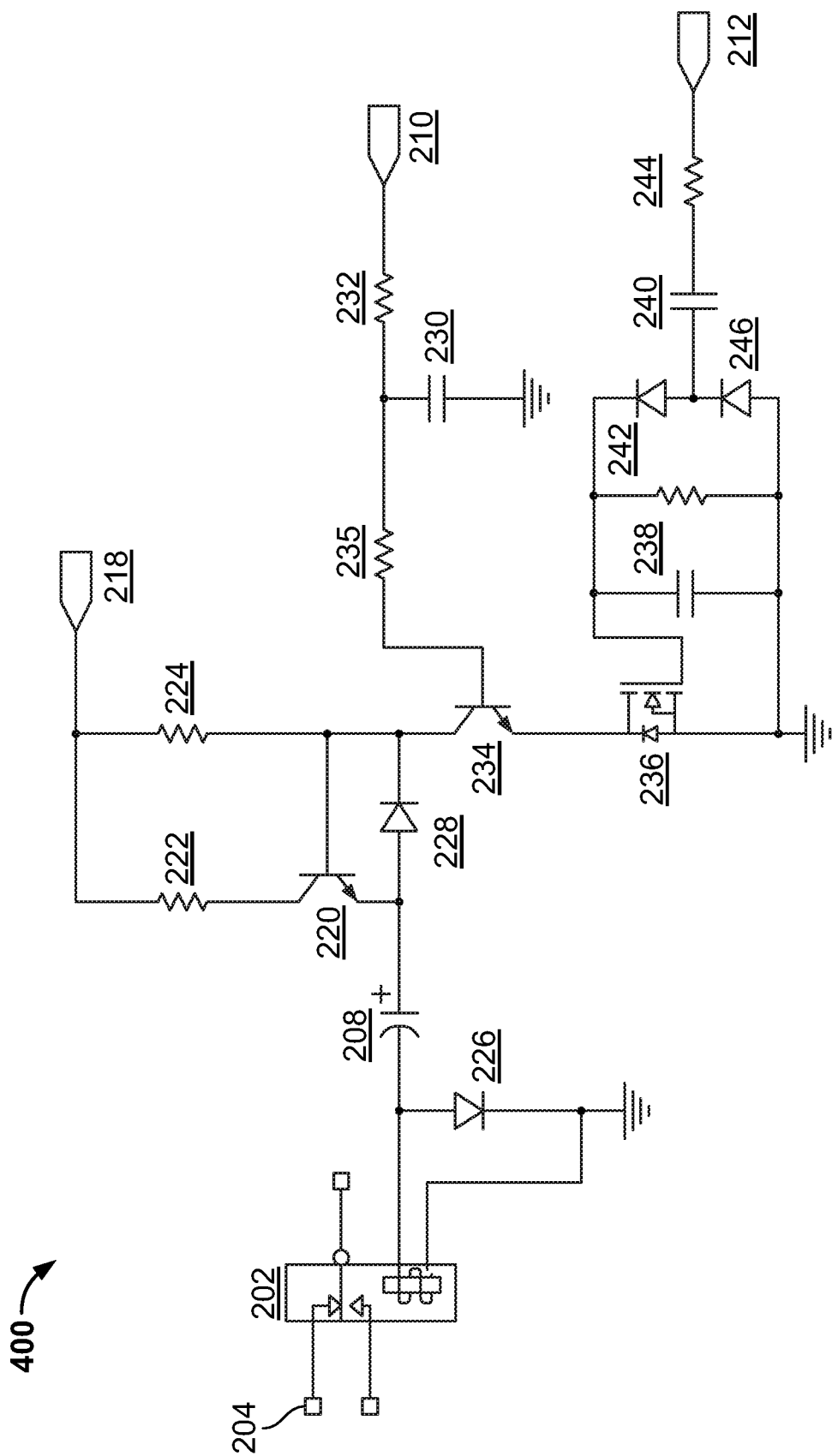
FIG. 4 is a wiring diagram of a safety gas valve relay driving circuit for an HVAC system according to another example embodiment of the present disclosure.

FIG. 4 illustrates a safety gas valve relay driving circuit 400 according to another example embodiment of the present disclosure. As shown in FIG. 4, the safety gas valve relay driving circuit 400 includes a gas valve relay 202 including an output 204 for selectively enabling and disabling a gas valve in an HVAC system according to an energization state of the gas valve relay 202.

A charge pump circuit is coupled with the gas valve relay 202 to control energization of the gas valve relay 202. The charge pump circuit includes a charge pump capacitor 208. As described above, the charge pump capacitor 208 in charge pump circuit alternately charged and discharged according to one or more driving pulse signals received at the input 210 and the input 212 of the safety gas valve relay driving circuit 400.

The charge pump capacitor 208 is coupled to receive a bias supply from a voltage supply node 218. As shown in FIG. 4, an emitter of a switch 220 is coupled with an anode of the charge pump capacitor 208. A resistor 222 is coupled between a collector of the switch 220 and the voltage supply node 218, and a resistor 224 is coupled between the base of the switch 220 and the voltage supply node 218.

A flyback diode 226 is coupled between the cathode of the charge pump capacitor 208 and an electrical ground for current continuity in the coil of the gas valve relay 202. Another diode 228 is coupled between the base and the emitter of the switch 220.

When the charge pump capacitor 208 is discharged, the coil of the gas valve relay 202 is energized to turn on (e.g., activate, etc.) a gas valve of an HVAC system. The charge pump capacitor 208 may inhibit activation of the gas valve relay 202 in response to a failed circuit component, such as a short-circuited switch, a constant logical high or low value driving signal, etc.

For example, a constant high or low level signal (due to a component failure, etc.) will keep the charge pump capacitor 208 constantly charged or discharged, and a constantly charged or discharged charge pump capacitor 208 will not discharge current to activate the gas valve relay 202.

The safety gas valve relay driving circuit 400 also includes a low-pass filter having a capacitor 230 and a resistor 232 in an RC low-pass filter arrangement. The low-pass filter is coupled to receive a driving signal from a controller (e.g., a microprocessor, an integrated control circuit, etc.) at the input 210. The low-pass filter is coupled between the input 210 and a switch 234 to filter the driving signal received from the controller.

The low-pass filter may be arranged to filter higher frequency signals, such as noise from a switched-mode power supply (SMPS) (e.g., greater than or equal to about twenty kilohertz, greater than or equal to about one megahertz, etc.). For example, capacitance and resistance values of the capacitor 230 and the resistor 232 may be selected to inhibit higher frequency signals from inadvertently turning on the gas valve relay 202, via the switch 234.

As shown in FIG. 4, the collector of the switch 234 is coupled to the base of the switch 220 to control charging and discharging of the charge pump capacitor 208. The capacitor 230 and the resistor 232 of the low-pass filter are coupled to the base of the switch 234 via a resistor 235 to control switching operation of the switch 234.

Therefore, the capacitor 230 and resistor 232 can filter out higher frequencies from inadvertently activating the gas valve relay 202, while driving signal(s) having a frequency below a low-pass filter threshold (e.g., less than about twenty kilohertz, etc.) are allowed to pass to control normal operation of the gas valve relay 202.

The safety gas valve relay driving circuit 400 further includes a high-pass filter watchdog circuit including two capacitors 238 and 240, two resistors 242 and 244, and one or more diodes 246. The high-pass filter watchdog circuit is coupled to receive a driving signal from a controller at the input 212 (e.g., which may be the same or different from the controller and/or driving signal provided to the input 210, etc.).

The high-pass filter watchdog circuit is coupled between the input 210 and a switch 236 to filter the driving signal received at the input 212. The high-pass filter watchdog circuit may be arranged to filter lower frequency signals, such as noise from an AC line input (e.g., less than or equal to about sixty hertz, etc.).

For example, the resistor 244 and the capacitor 240 are coupled to the input 212 in an RC high-pass filter arrangement, and resistance and capacitance values of the resistor 244 and the capacitor 240 may be selected to inhibit lower frequency signals from passing to the switch 236. As shown in FIG. 4, the switch 236 is coupled to the emitter of the switch 234.

Additionally, the capacitor 238, the resistor 242 and the diode(s) 246 are each coupled between the gate of the switch 236 and an electrical ground. Low frequency AC line noise may not charge the capacitor 238 to a high enough level to turn on the switch 236, so AC line noise will not inadvertently turn on the gas valve relay 202.

In the safety gas valve relay driving circuit 400, a frequency of the driving signal(s) should be within a specified frequency band range in order to energize the gas valve relay 202. For example, the frequency of the driving signal(s) should be below a filter frequency of the low-pass filter including capacitor 230 and resistor 232 (e.g., less than about twenty kilohertz, etc.), and should be above a filter frequency of the high-pass filter watchdog circuit including capacitor 240 and 244 (e.g., greater than about sixty hertz, etc.) in order to energize the gas valve relay 202.

In this manner, the safety gas valve relay driving circuit 400 can provide good noise rejection for AC line frequencies, good noise rejection for switched-mode power supply frequencies, etc. This allows for convenient printed circuit board layouts where there is no requirement to separate traces that have AC line frequency signal, etc.

Although FIG. 4 illustrates switches 220 and 234 as bipolar-junction transistors, and illustrates switch 236 as a metal-oxide semiconductor field-effect transistor (MOSFET), other embodiments may include other types of switching elements (e.g., different transistors, etc.), may include switches coupled with one another in different circuit arrangements, etc.

Example controllers and circuits described herein may be configured to perform operations using any suitable combination of hardware and software. For example, the controllers and circuits may include any suitable circuitry, logic gates, microprocessor(s), computer-executable instructions stored in memory, etc., operable to cause the controllers and circuits to perform actions described herein (e.g., supplying a driving signal, etc.).

According to another example embodiment, a safety gas valve relay driving circuit for an HVAC system includes a gas valve relay including an output for selectively enabling and disabling a gas valve in an HVAC system according to an energization state of the gas valve relay, and at least one input for receiving a driving signal from at least one controller.

The safety gas valve relay driving circuit also includes a low-pass filter coupled between the at least one input and the gas valve relay to filter the received first driving signal for inhibiting activation of the gas valve relay in response to switched-mode power supply noise, and a high-pass filter coupled between the at least one input and the gas valve relay to filter the received second driving signal for inhibiting activation of the gas valve relay in response to alternating-current (AC) line noise.

According to another example embodiment of the present disclosure, a method of driving a gas valve relay for an HVAC system is disclosed. The gas valve relay includes an output for selectively enabling and disabling a gas valve in an HVAC system according to an energization state of the gas valve relay.

The method includes controlling energization of the gas valve relay by a charge pump circuit including a charge pump capacitor, and filtering, by a low-pass filter, a first driving signal for controlling energization of the gas valve relay via the charge pump circuit, to inhibit activation of the gas valve relay in response to switched-mode power supply noise.

The method also includes filtering, by a high-pass filter, the first driving signal or another signal for controlling energization of the gas valve relay via the charge pump circuit, to inhibit activation of the gas valve relay in response to alternating-current (AC) line noise.

In some embodiments, filtering the first driving signal by the low-pass filter may include inhibiting frequencies greater than or equal to twenty kilohertz, and filtering the first driving signal or another signal by the high-pass filter may include inhibiting frequencies less than or equal to sixty hertz.

In some embodiments, the method may further include inhibiting, by the low-pass filter and the high-pass filter, activation of the gas valve relay in response to failure of one or more components of the low-pass filter, the high-pass filter or the charge pump circuit.

Example embodiments disclosed herein may provide one or more (or none) of the following advantages: good noise rejection of AC line frequency signals, good noise rejection of switched-mode power supply frequencies, an additional cutoff circuit to inhibit inadvertent activation of a gas valve relay, increase convenience in PCB layout due to no requirement for separate traces for AC line frequency signals, reduction in time and iterations needed for board design, inhibition of inadvertent activation of a gas valve relay due to induced electromagnetic interference (EMI), etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A safety gas valve relay driving circuit for an HVAC system, the circuit comprising:
   a gas valve relay including an output for selectively enabling and disabling a gas valve in an HVAC system according to an energization state of the gas valve relay;
   a charge pump circuit coupled with the gas valve relay to control energization of the gas valve relay, the charge pump circuit including a charge pump capacitor;
   a first input for receiving a first driving signal from at least one controller;
   a second input for receiving a second driving signal from the at least one controller;
   a low-pass filter coupled between the first input and the charge pump circuit to filter the received first driving signal; and
   a high-pass filter watchdog circuit coupled between the second input and the charge pump circuit to filter the received second driving signal;

wherein the low-pass filter comprises an RC filter including a resistor coupled between the first input and a capacitor; and
wherein the low-pass filter is adapted to inhibit frequencies greater than or equal to twenty kilohertz.

2. A safety gas valve relay driving circuit for an HVAC system, the circuit comprising:
a gas valve relay including an output for selectively enabling and disabling a gas valve in an HVAC system according to an energization state of the gas valve relay;
a charge pump circuit coupled with the gas valve relay to control energization of the gas valve relay, the charge pump circuit including a charge pump capacitor;
a first input for receiving a first driving signal from at least one controller;
a second input for receiving a second driving signal from the at least one controller;
a low-pass filter coupled between the first input and the charge pump circuit to filter the received first driving signal; and
wherein the high-pass filter watchdog circuit includes a switch, a diode, two capacitors, and two resistors.

3. The safety gas valve relay driving circuit of claim 2, wherein the low-pass filter comprises an RC filter including a resistor coupled between the first input and a capacitor.

4. The safety gas valve relay driving circuit of claim 2, wherein the high-pass filter watchdog circuit is adapted to inhibit frequencies less than or equal to sixty hertz.

5. The safety gas valve relay driving circuit of claim 2, wherein:
a first one of the two capacitors and a first one of the two resistors are coupled in parallel between a gate of the switch and an electrical ground; and
the diode, the other of the two capacitors and the other of the two resistors are coupled between the second input and the gate of the switch.

6. The safety gas relay driving circuit of claim 5, wherein the first one of the two capacitors is arranged to charge to a level for turning on the switch only when the second driving signal includes a frequency greater than sixty hertz.

7. The safety gas valve relay driving circuit of claim 2, wherein the safety gas valve relay driving circuit comprises a single stage furnace control.

8. The safety gas valve relay driving circuit of claim 2, wherein the low-pass filter and the high-pass filter watchdog circuit are arranged to inhibit activation of the gas valve relay in response to switching-mode power supply noise and/or alternating-current (AC) line noise.

9. The safety gas valve relay driving circuit of claim 2, wherein the charge pump circuit, the low-pass filter, and the high-pass filter watchdog circuit are arranged to inhibit activation of the gas valve relay in response to failure of one or more components safety gas valve relay driving circuit.

10. A safety gas valve relay driving circuit for an HVAC system, the circuit comprising:
a gas valve relay including an output for selectively enabling and disabling a gas valve in an HVAC system according to an energization state of the gas valve relay;
a charge pump circuit coupled with the gas valve relay to control energization of the gas valve relay, the charge pump circuit including a charge pump capacitor;
a first input for receiving a first driving signal from at least one controller;
a second input for receiving a second driving signal from the at least one controller;
a low-pass filter coupled between the first input and the charge pump circuit to filter the received first driving signal; and
wherein:
the charge pump circuit includes a first switch and a second switch;
a base of the first switch is coupled to the low-pass filter; and
a base of the second switch is coupled between a collector of the first switch and a voltage bias supply input.

11. The safety gas valve relay driving circuit of claim 10, wherein:
the charge pump circuit includes a diode coupled between an emitter of the second switch and the collector of the first switch; and
the charge pump capacitor is coupled between the gas valve relay and the emitter of the second switch.

12. A safety gas valve relay driving circuit for an HVAC system, the circuit comprising:
a gas valve relay including an output for selectively enabling and disabling a gas valve in an HVAC system according to an energization state of the gas valve relay;
at least one input for receiving a driving signal from at least one controller;
a low-pass filter coupled between the at least one input and the gas valve relay to filter the received first driving signal for inhibiting activation of the gas valve relay in response to switched-mode power supply noise; and
a high-pass filter coupled between the at least one input and the gas valve relay to filter the received second driving signal for inhibiting activation of the gas valve relay in response to alternating-current (AC) line noise;
wherein the low-pass filter is adapted to inhibit frequencies greater than or equal to twenty kilohertz and the high-pass filter is adapted to inhibit frequencies less than or equal to sixty hertz.

13. A safety gas valve relay driving circuit for an HVAC system, the circuit comprising:
a gas valve relay including an output for selectively enabling and disabling a gas valve in an HVAC system according to an energization state of the gas valve relay;
at least one input for receiving a driving signal from at least one controller;
a low-pass filter coupled between the at least one input and the gas valve relay to filter the received first driving signal for inhibiting activation of the gas valve relay in response to switched-mode power supply noise; and
a high-pass filter coupled between the at least one input and the gas valve relay to filter the received second driving signal for inhibiting activation of the gas valve relay in response to alternating-current (AC) line noise;
wherein the low-pass filter and the high-pass filter are arranged to inhibit activation of the gas valve relay in response to failure of one or more components safety gas valve relay driving circuit.

14. A safety gas valve relay driving circuit for an HVAC system, the circuit comprising:
a gas valve relay including an output for selectively enabling and disabling a gas valve in an HVAC system according to an energization state of the gas valve relay;
at least one input for receiving a driving signal from at least one controller;
a low-pass filter coupled between the at least one input and the gas valve relay to filter the received first driving signal for inhibiting activation of the gas valve relay in response to switched-mode power supply noise; and a high-pass filter coupled between the at least one input and the gas valve relay to filter the received second driving signal for inhibiting activation of the gas valve relay in response to alternating-current (AC) line noise;

wherein:
the low-pass filter comprises an RC filter including a resistor coupled between the first input and a capacitor; and the high-pass filter includes a switch, a diode, two capacitors, and two resistors.

15. A safety gas valve relay driving circuit for an HVAC system, the circuit comprising:
a gas valve relay including an output for selectively enabling and disabling a gas valve in an HVAC system according to an energization state of the gas valve relay;
at least one input for receiving a driving signal from at least one controller;
a low-pass filter coupled between the at least one input and the gas valve relay to filter the received first driving signal for inhibiting activation of the gas valve relay in response to switched-mode power supply noise; and
a high-pass filter coupled between the at least one input and the gas valve relay to filter the received second driving signal for inhibiting activation of the gas valve relay in response to alternating-current (AC) line noise;
wherein the safety gas valve relay driving circuit comprises a single stage furnace control.

16. A method of driving a gas valve relay for an HVAC system, the gas valve relay including an output for selectively enabling and disabling a gas valve in an HVAC system according to an energization state of the gas valve relay, the method comprising:
controlling energization of the gas valve relay by a charge pump circuit including a charge pump capacitor;
filtering, by a low-pass filter, a first driving signal for controlling energization of the gas valve relay via the charge pump circuit, to inhibit activation of the gas valve relay in response to switched-mode power supply noise; and
filtering, by a high-pass filter, the first driving signal or another signal for controlling energization of the gas valve relay via the charge pump circuit, to inhibit activation of the gas valve relay in response to alternating-current (AC) line noise;
wherein filtering the first driving signal by the low-pass filter includes inhibiting frequencies greater than or equal to twenty kilohertz, and filtering the first driving signal or another signal by the high-pass filter includes inhibiting frequencies less than or equal to sixty hertz.

17. A method of driving a gas valve relay for an HVAC system, the gas valve relay including an output for selectively enabling and disabling a gas valve in an HVAC system according to an energization state of the gas valve relay, the method comprising:
controlling energization of the gas valve relay by a charge pump circuit including a charge pump capacitor;
filtering, by a low-pass filter, a first driving signal for controlling energization of the gas valve relay via the charge pump circuit, to inhibit activation of the gas valve relay in response to switched-mode power supply noise;
filtering, by a high-pass filter, the first driving signal or another signal for controlling energization of the gas valve relay via the charge pump circuit, to inhibit activation of the gas valve relay in response to alternating-current (AC) line noise;
inhibiting, by the low-pass filter and the high-pass filter, activation of the gas valve relay in response to failure of one or more components of the low-pass filter, the high-pass filter or the charge pump circuit.

* * * * *